US012639981B2

(12) United States Patent　　　　(10) Patent No.:　US 12,639,981 B2
　Lyu et al.　　　　　　　　　　　　 (45) Date of Patent:　May 26, 2026

(54) METHOD AND SYSTEM FOR IDENTIFYING HUMAN INTERACTIVE BEHAVIOR BASED ON MULTI-VIEW COMPARISON

(71) Applicant: Shandong Normal University, Jinan (CN)

(72) Inventors: Lei Lyu, Jinan (CN); Chen Pang, Jinan (CN); Xiang Liu, Jinan (CN)

(73) Assignee: Shandong Normal University, Jinan (CN)

( * ) Notice:　Subject to any disclaimer, the term of this patent is extended or adjusted under 35 U.S.C. 154(b) by 292 days.

(21) Appl. No.: 18/396,727

(22) Filed:　Dec. 27, 2023

(65)　　　　　Prior Publication Data

US 2024/0395067 A1　Nov. 28, 2024

(30)　　Foreign Application Priority Data

May 22, 2023　(CN) ......................... 202310589264.4

(51) Int. Cl.
　　*G06V 40/20*　　　(2022.01)
　　*G06T 5/70*　　　　(2024.01)
　　*G06V 10/764*　　 (2022.01)
　　*H04N 13/351*　　 (2018.01)
(52) U.S. Cl.
　　CPC .............. *G06V 40/20* (2022.01); *G06T 5/70* (2024.01); *G06V 10/764* (2022.01); *H04N 13/351* (2018.05); *G06T 2207/20044* (2013.01)
(58) Field of Classification Search
　　CPC ...... G06V 40/20; G06V 10/764; G06V 10/82; G06V 10/84; G06V 40/23; G06V 10/30; G06T 5/70; G06T 2207/20044; H04N 13/351; G06F 18/29; Y02D 10/00
　　See application file for complete search history.

(56)　　　　　　References Cited

U.S. PATENT DOCUMENTS

2024/0096134 A1 *　3/2024　Shahid .................... G06V 20/64
2024/0177525 A1 *　5/2024　Ma ......................... G06V 20/52

FOREIGN PATENT DOCUMENTS

CN　　109858390 A　*　6/2019
CN　　111476181 A　*　7/2020　......... G06F 18/2415
CN　　114613013 A　*　6/2022　........... G06F 18/214

* cited by examiner

*Primary Examiner* — Jennifer Mehmood
*Assistant Examiner* — Vaisali Rao Koppolu
(74) *Attorney, Agent, or Firm* — Hemisphere Law, PLLC

(57)　　　　　　　　ABSTRACT

A method and a system for identifying human interactive behavior based on multi-view comparison are provided, belonging to the field of computer vision. The method includes acquiring position information of human joints in each frame of video data; constructing a skeleton spatio-temporal graph based on the position information of the human joints in each frame; based on skeleton spatio-temporal graph, adaptively deleting an edge or a node of the skeleton spatio-temporal graph through a graph convolution neural network, and constructing enhanced node-dropping and edge-dropping views; using an information bottleneck principle, increasing a difference between the enhanced view and an original skeleton spatio-temporal graph, simultaneously maximizing information related to a behavior recognition task, and reserving minimum enough information for the behavior recognition task in each view to obtain a multi-view representation; and obtaining a human interactive behavior recognition result based on the multi-view representation.

7 Claims, 5 Drawing Sheets

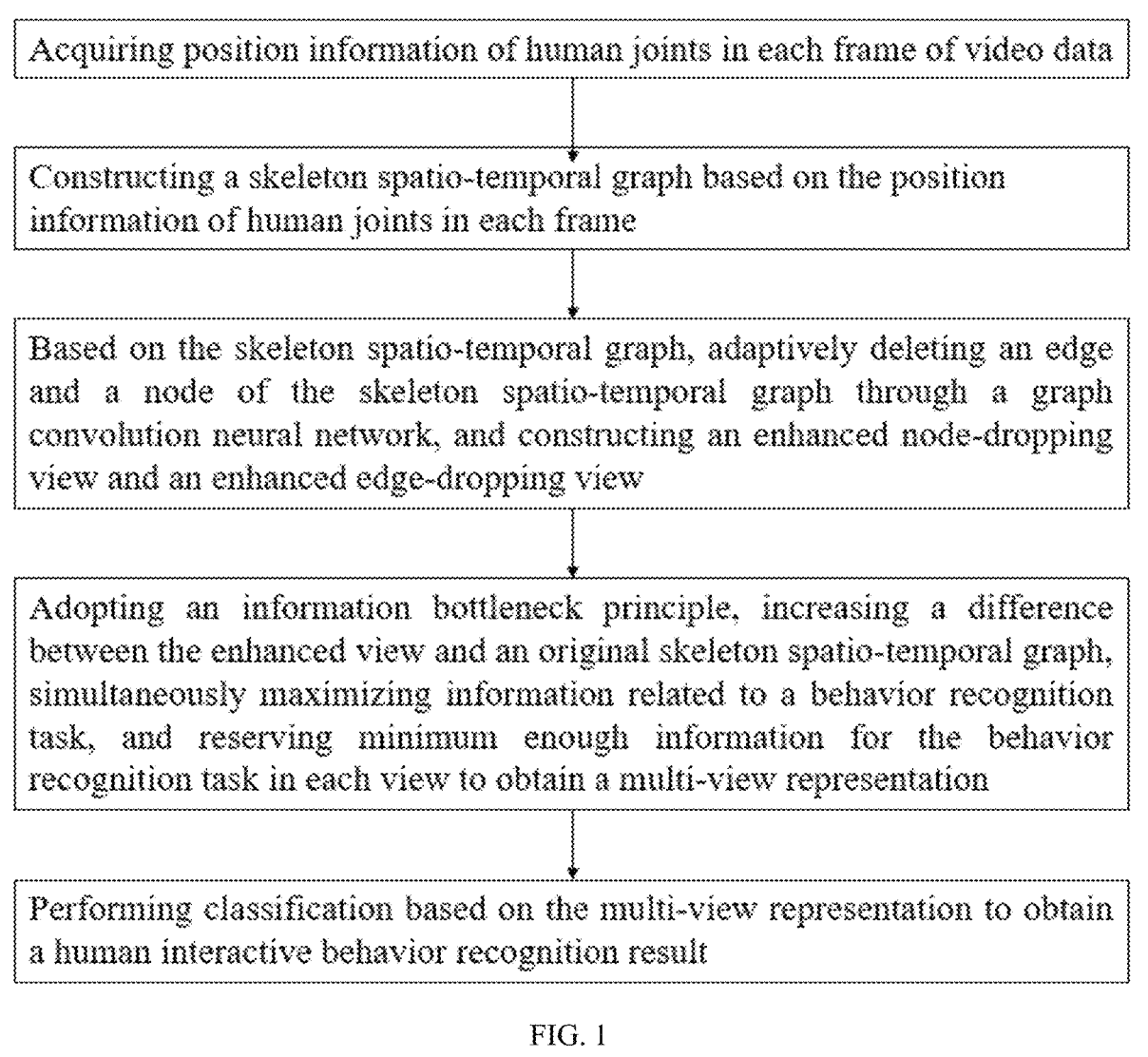

Acquiring position information of human joints in each frame of video data

Constructing a skeleton spatio-temporal graph based on the position information of human joints in each frame Based on the skeleton spatio-temporal graph, adaptively deleting an edge and a node of the skeleton spatio-temporal graph through a graph convolution neural network, and constructing an enhanced node-dropping view and an enhanced edge-dropping view Adopting an information bottleneck principle, increasing a difference between the enhanced view and an original skeleton spatio-temporal graph, simultaneously maximizing information related to a behavior recognition task, and reserving minimum enough information for the behavior recognition task in each view to obtain a multi-view representation Performing classification based on the multi-view representation to obtain a human interactive behavior recognition result

FIG. 1

METHOD AND SYSTEM FOR IDENTIFYING HUMAN INTERACTIVE BEHAVIOR BASED ON MULTI-VIEW COMPARISON

TECHNICAL FIELD

The disclosure relates to the technical field of computer vision, and more particularly to a method and a system for identifying human interactive behavior based on multi-view comparison.

BACKGROUND

Statements in this section merely provide background information related to the disclosure and do not necessarily constitute related art.

With the gradual promotion and popularization of high-definition video surveillance, surveillance video data is increasing. In the field of security, especially in public places, people's behavior needs to be monitored in real-time to prevent accidents. With the rapid development of computer vision technology, the accuracy of individual behavior recognition has been greatly improved, but the complex issues of human interaction between multiple people with intricate relationships have not been fully resolved. In real life, the common behaviors are mostly interactive behaviors, such as shaking hands, hugging, fighting, and so on. Compared with single-person actions, interactive actions are complicated, with more types of body movements and more diversified changes between limbs. Therefore, how to efficiently extract the characteristics of interactive behavior and model interactive behavior is a challenging problem.

According to the source of data, human behavior recognition methods can be divided into three categories: human behavior recognition methods based on red, green and blue (RGB) video, human behavior recognition methods based on depth map, and human behavior recognition methods based on skeleton sequence. RGB video data provides the necessary spatial and temporal information for human behavior recognition, but it does not contain the structural information of human actions distributed in three-dimensional space (such as positions and angles of each joint or body part of the human body, and their relative relationships). It can only provide the two-dimensional spatial state of people, and it is easily disturbed by factors such as complex background, lighting, and angle of view changes, resulting in reduced accuracy of action recognition. Compared with the RGB video data, the depth map can provide information such as the distance between a viewpoint and an object, coordinates of respective joints or respective components of the human body in the three-dimensional space, outline and texture of the human body in the three-dimensional space, and can separate people from the background. However, such methods as the depth map require computing equipment to have a large memory space and a strong computing power. The skeleton sequence can define human body posture through the relative position information of joint points, which can represent the geometric structure of human motion mode more truly. Compared with image features, skeleton features are more compact and more specific in describing human movement, and are not easily affected by light and background changes.

In summary, the inventors found that the related art has technical problems as follows.

(1) Interactive noise. In the interactive behavior, due to the sensor errors or occlusions, there is often noise interference, resulting in the inability to clearly simulate the relationship between the body parts of subject interaction, which is key information of interaction recognition. However, graph convolution models are susceptible to the quality of the input graph, which means that aggregating misleading neighborhood information may result in suboptimal performance.

(2) Skeleton data has diversity and complexity. Different people may have different heights, body shapes, postures and action modes. And the same behavior may have different execution speeds, amplitudes and angles. This kind of data with inconsistent distribution will make the graph convolution models tend to be biased towards data with certain or several distributions, which will hinder the learning of behavior representation.

SUMMARY

In order to solve at least one of the technical problems existing in the above background, the disclosure provides a method and a system for identifying human interactive behavior based on multi-view comparison. It can learn whether to delete edges or nodes, transform the original skeleton graph into related views, and then integrate different views into a compact representation of a downstream behavior recognition task. At the same time, the method is optimized with the downstream behavior recognition task in an end-to-end manner, further improving robustness of a model.

In order to achieve the above purposes, the disclosure adopts the following technical solutions.

In a first aspect, the disclosure provides a method for identifying human interactive behavior based on multi-view comparison, which includes the following steps:

acquiring position information of human joints in each frame of video data;

constructing a skeleton spatio-temporal graph based on the position information of human joints in each frame;

based on the skeleton spatio-temporal graph, adaptively deleting several nodes and edges of the skeleton spatio-temporal graph, and constructing enhanced node-dropping and edge-dropping views;

adopting an information bottleneck principle, increasing a difference between the enhanced view and the original skeleton spatio-temporal graph, simultaneously maximizing information related to a behavior recognition task, and reserving minimum enough information for the behavior recognition task in each view to obtain a multi-view representation;

performing classification based on the multi-view representation to obtain a human interactive behavior recognition result.

In this situation, the obtained human interactive behavior recognition result is applied to monitor and recognize the people's interactive behavior in real-time from surveillance video data in public places to prevent accidents. When dangerous behaviors such as stealing, shoving and fighting occur in public places with more people, the intelligent video surveillance system with abnormal behavior analysis function can assist the staff to detect and issue alarms on dangerous behaviors, greatly reducing human input and ensuring social security.

In a second aspect, the disclosure provides a system for identifying human interactive behavior based on multi-view comparison, which includes a joint information acquirer (also referred to as joint information acquisition module), a skeleton spatio-temporal graph constructor (also referred to as skeleton spatio-temporal graph construction module), an enhanced view constructor (also referred to as enhanced view construction module), a multi-view presenter (also referred to as multi-view representation module), and a behavior recognizer (also referred to as behavior recognition module).

The joint information acquisition module is configured (i.e., arranged and structured) to acquire position information of human joints in each frame of video data.

The skeleton spatio-temporal graph construction module is configured to construct a skeleton spatio-temporal graph based on the position information of human joints in each frame.

The enhanced view construction module is configured to adaptively delete an edge or a node of the skeleton spatio-temporal graph based on the skeleton spatio-temporal graph through a graph convolution neural network, and construct an enhanced node-dropping view and an enhanced edge-dropping view.

The multi-view representation module is configured to adopt an information bottleneck principle, increase a difference between the enhanced view and an original skeleton spatio-temporal graph, maximize information related to a behavior recognition task simultaneously, and reserve minimum enough information for the behavior recognition task in each view to obtain a multi-view representation.

The behavior recognition module is configured to perform classification based on the obtained multi-view representation to obtain a human interactive behavior recognition result.

In a third aspect, the disclosure provides a non-transitory computer-readable storage medium.

The non-transitory computer-readable storage medium is stored with a computer program, and the computer program is configured to, when being executed by a processor, implement steps in the method for identifying human interactive behavior based on multi-view comparison.

In a fourth aspect, the disclosure provides a computer device.

The computer device includes a memory, a processor and a computer program stored in the memory and capable of being run on the processor, and the processor is configured to, when executing the computer program, implement steps in the method for identifying human interactive behavior based on multi-view comparison.

Compared with the related art, the disclosure has the beneficial effects as follows.

1. Aiming at the problems of noise in the interactive graph and diversity and complexity of skeleton data, the disclosure uses an effective augmented mode to make different views cover an optimal region as much as possible and simultaneously reduce useless information as much as possible. By adaptively deleting nodes and edges to construct an optimized graph structure, the problem of uneven distribution can be well alleviated. In each view, the minimum enough information is reserved for the downstream behavior recognition task, and the information unrelated to behavior recognition is discarded to solve the problem of interactive noise. In this way, the multi-view representation learning of interactive behavior from different aspects can be better learned, and further better realizing the recognition of interactive behavior.

2. In addition, the disclosure considers that the skeleton data can reduce the impact of unnecessary factors such as viewpoint and background, and the graph convolution neural network can directly process the topological graph of skeleton data, and can effectively capture the spatio-temporal relationship and context information in the skeleton data.

Advantages of additional aspects of the disclosure are partly given in the description below, and in part will be obvious from the description below, or may be known by practice of the disclosure.

BRIEF DESCRIPTION OF DRAWINGS

The accompanying drawings, which constitute a part of the disclosure, are used to provide a further understanding of the disclosure, and the illustrative embodiments of the disclosure and their descriptions are used to interpret the disclosure, and do not constitute undue limitations on the disclosure.

FIG. 1 illustrates a flowchart of a method for identifying human interactive behavior based on multi-view comparison according to an embodiment of the disclosure.

DETAILED DESCRIPTION OF EMBODIMENTS

The disclosure will be further explained with the attached drawings and embodiments below.

It should be noted that the following detailed description is illustrative and is intended to provide further explanation of the disclosure. Unless otherwise specified, all technical and scientific terms used herein have the same meaning as commonly understood by those skilled in the related art to which this disclosure belongs.

It should be noted that the terms used herein are only for describing specific embodiments and are not intended to limit exemplary embodiments according to the disclosure. As used herein, the singular form is also intended to include the plural form unless the context clearly indicates otherwise. In addition, it should be understood that when the terms "containing" and/or "including" are used in this specification, they indicate the presence of features, steps, operations, devices, components and/or combinations thereof.

Aiming at the technical problems mentioned in the background, the disclosure provides a method for identifying human interactive behavior based on multi-view comparison. Aiming at unnecessary parameters such as viewpoint and lighting, the method of extracting human body posture map from input video frames is adopted, and in this situation, an effective augmented mode is considered to solve the problems of noise in the interactive graph and diversity and complexity of skeleton data, so that different views can cover an optimal region as much as possible, and simultaneously, useless information can be reduced as much as possible. By adaptively deleting nodes and edges to construct an optimized graph structure, the problem of uneven distribution can be well alleviated. In each view, the minimum enough information is reserved for a downstream behavior recognition task, and the information unrelated to behavior recognition is discarded to solve the problem of interactive noise. In this way, the multi-view representation learning of interactive behavior from different aspects can be better learned, and further better realizing the recognition of interactive behavior.

Embodiment 1

Figure 2:
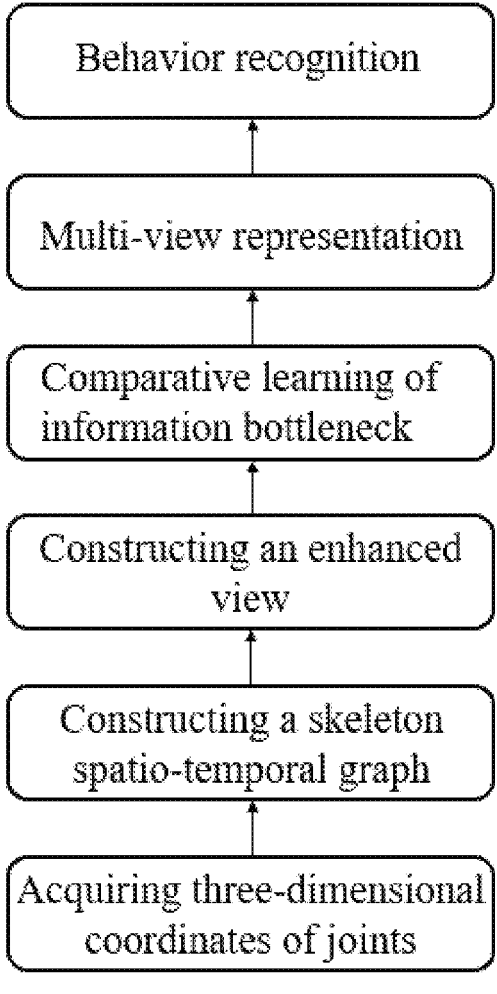
FIG. 2 illustrates another flowchart of the method for identifying human interactive behavior based on multi-view comparison according to the embodiment of the disclosure.

As shown in FIG. 1 and FIG. 2, this embodiment provides a method for identifying human interactive behavior based on multi-view comparison, which includes the following steps.

Step 1, position information of human joints in each frame of video data is acquired.

In the step 1, the posture estimation algorithm is adopted to estimate the posture based on video data to obtain the position information of human joints. In this embodiment, the posture estimation algorithm can adopt the existing algorithm, such as OpenPose, which can be set by those skilled in the related art according to the specific working conditions, and will not be described in detail herein.

Step 2, a skeleton spatio-temporal graph is constructed based on the position information of human joints in each frame.

Figure 3:
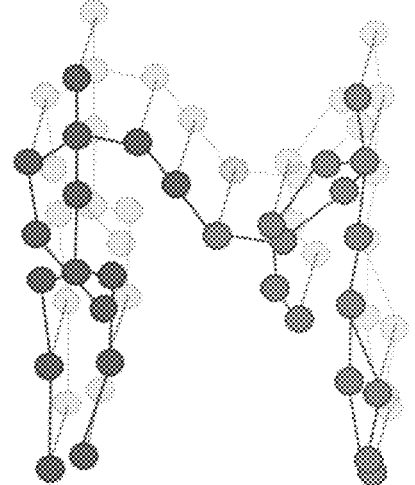
FIG. 3 illustrates an example of an established spatio-temporal graph according to an embodiment of the disclosure.

As shown in FIG. 3, in the step 2, the skeleton spatio-temporal graph is constructed based on position coordinate information of human joints in each frame of video.

In a spatial dimension, firstly, spatial positions of the joint points are determined according to the coordinate information of the joint points in each frame, and then the corresponding edges are drawn according to a natural structure of a human body to obtain a spatial topological graph of a skeleton sequence. After constructing the spatial topological graph of the skeleton sequence, a skeleton spatio-temporal sequence graph can be formed by connecting nodes representing the same joint in adjacent frames.

That is, in the spatial dimension, the skeleton graph in each frame is defined by using the natural structure of the human body to form the spatial topological graph of the skeleton sequence. In a temporal dimension, the joint points representing the same part in adjacent frames are connected to form the skeleton spatio-temporal sequence graph. The spatial relationship is constructed by constructing a spatial graph according to the natural skeleton connection relationship of the human body within each frame, and the temporal relationship is constructed by connecting the same joints between consecutive frames.

Figure 4:
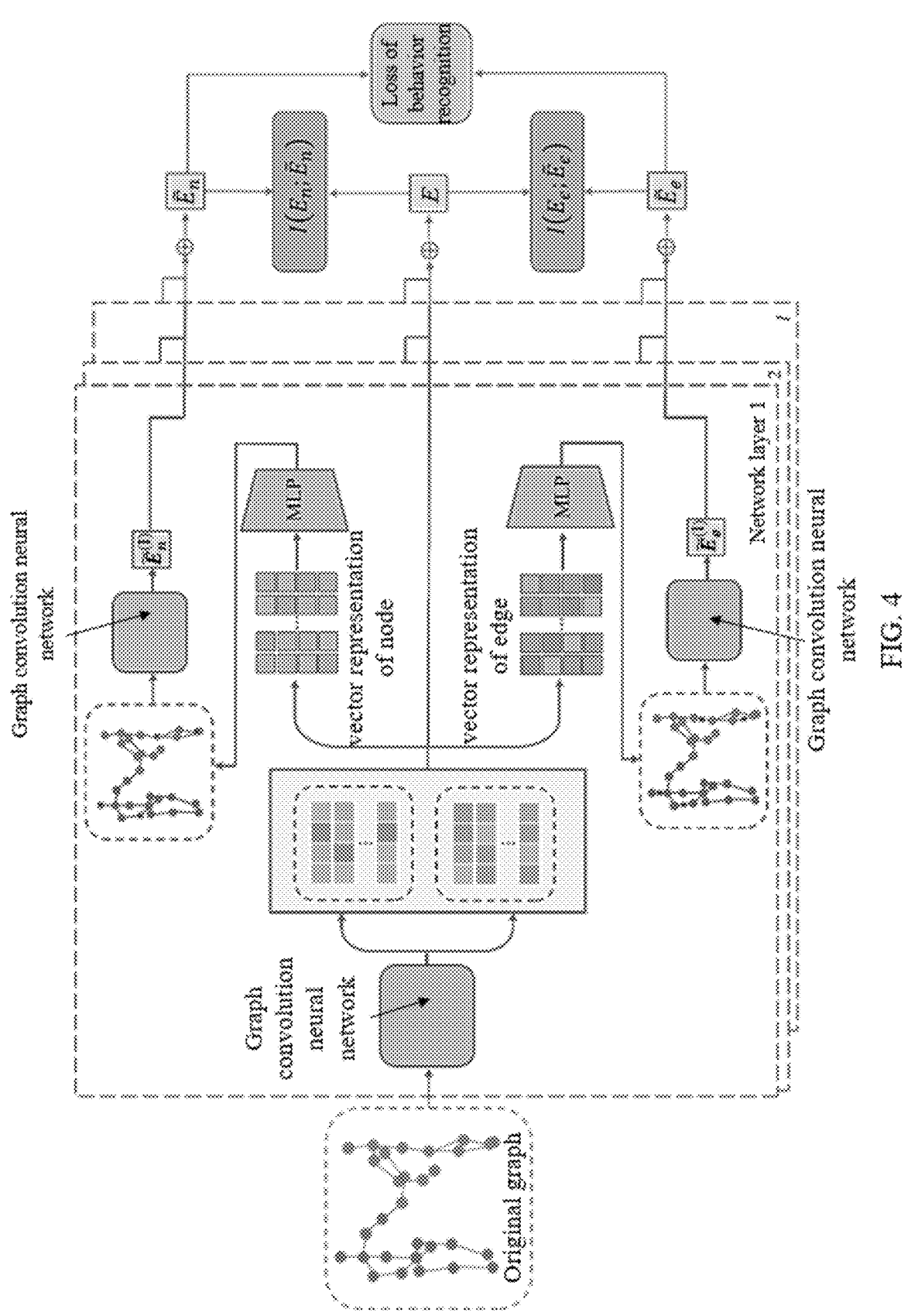
FIG. 4 illustrates an overall structure of a multi-view comparison network according to an embodiment of the disclosure.

As shown in FIG. 4, step 3, based on the skeleton spatio-temporal graph, nodes or edges of the skeleton spatio-temporal graph are adaptively deleted through a graph convolution neural network, and an enhanced node-dropping view or an enhanced edge-dropping view is constructed. The skeleton spatio-temporal graph input the network is in the form of an adjacency matrix, and the size of the adjacency matrix is n*n, where n represents the number of nodes in the graph. If there is a connection between two nodes, the element value of the corresponding position in the adjacency matrix is 1, and vice versa is 0.

The step 3 specifically includes the following steps. Step 301, the nodes of the skeleton spatio-temporal graph are adaptively deleted based on the skeleton spatio-temporal graph through the graph convolution neural network, and an enhanced node-dropping view is constructed.

Specifically, deletable nodes are learned at each layer of the graph convolutional neural network to shield those influential nodes, and a node-dropping view is created (i.e., the enhanced node-dropping view), which can be expressed as:

$$G_{ND}^{(l)} = \{\{v_i \odot \rho_i^{(l)} \mid v_i \in V\}, \varepsilon\}. \tag{1}$$

Specifically, $$G_{ND}^{(l)}$$

represents the node-dropping view created after shielding those influential nodes, $v_i$ represents the i-th node in the l-th network layer, and $$\rho_i^{(l)} \in (0, 1)$$

comes from a Bernoulli distribution parameterized as $$\omega_i^{(l)},$$

that is, $$\rho_i^{(l)} \sim Bern(\omega_i^{(l)}),$$

which indicates whether the node $v_i$ is reserved or not, and $\varepsilon$ represents a set of edges.

In this embodiment, the influential nodes refer to nodes that have an impact on the final recognition effect, and these nodes usually refer to noise nodes and nodes that contribute to most actions. Noise nodes will bring errors to the recognition process. The nodes that contribute to most actions will be paid too much attention, which will make the difference between different actions smaller.

Simply deleting the selected nodes and all their connections will result in great changes in the graph structure, which will have an impact on the information aggregation and make the training unstable.

Therefore, in this embodiment, the node to be deleted of the skeleton spatio-temporal graph is replaced with the representation of a local subgraph of the node to be deleted, so as to blur its original representation and preserve its corresponding edges.

Specifically, multi-layer perceptron (MLP) is used to control whether the node is shielded or not.

$$\omega_i^{(l)} = MLPs(v_i^{(l)}) \tag{2}$$

Where $$\omega_i^{(l)}$$

represents whether the i-th node of the l-th layer needs to be shielded, and $$v_i^{(l)}$$

represents the i-th node of the l-th layer.

For node v, a random walk is performed on graph G with step size k, and then the mean value of sampling nodes is pooled as the representation of local subgraph of v.

Step 302, based on the skeleton spatio-temporal graph, the edges of the skeleton spatio-temporal graph are adaptively deleted through the graph convolution neural network, and an enhanced edge-dropping view is constructed.

Specifically, a goal of the edge-dropping view is to generate a subgraph that filters out the noisy edges and intentionally reduces the effect of certain distributions on the graph convolutional network (GCN) layer.

Similar to the node-dropping view, an edge-dropping view (i.e., the enhanced edge-dropping view) through learnable edge deletion operation can be created:

$$G_{ED}^{(l)} = \{V, \{e_{ij} \odot \rho_{ij}^{(l)} \mid e_{ij} \in \varepsilon\}\}. \tag{3}$$

Specifically, $$\rho_i^{(l)} \in \{0, 1\}$$

also obeys $$\rho_i^{(l)} \sim Bern(\omega_i^{(l)})$$

distribution, which indicates whether the edge $e_{ij}$ is preserved.

Similarly, MLPs are also used for the parameter $$\omega_i^{(l)}$$

to control whether the edge $e_{ij}$ is shielded or not.

$$\omega_{ij}^{(l)} = MLPs([v_i^{(l)}, v_j^{(l)}]) \tag{4}$$

Specifically, $$\omega_i^{(l)}$$

represents whether the edge $e_{ij}$ needs to be shielded, $$[v_i^{(l)}, v_j^{(l)}]$$

represents the edge $e_{ij}$.

Step 4, adopting an information bottleneck principle, minimum enough information for the behavior recognition task in each view is reserved, the difference between the enhanced view and the original skeleton spatio-temporal graph is increased, and the information related to the behavior recognition task is simultaneously maximized, so as to obtain a multi-view representation.

In the step 4, minimizing the mutual information between the enhanced view and the original graph by using negative contrastive learning loss InfoNCE can remove redundant information in each view, thus achieving the minimum enough information for the downstream behavior recognition task.

$$\min_{(E, \tilde{E})} \tilde{L}_{rec} + I(E_n; \tilde{E}_n) + I(E_e; \tilde{E}_e), \tag{5}$$

$$I(E_n; \tilde{E}_n) = \sum_{v_i \in V} \log \frac{\exp(s(v_i, \tilde{v}_i))}{\sum_{v_j \in v} \exp(s(v_i, \tilde{v}_j))}, \tag{6}$$

$$I(E_e; \tilde{E}_e) = e_i \in u \log \frac{\exp(s(e_i, \tilde{e}_i))}{\sum_{e_j \in u} \exp(s(e_i, \tilde{e}_j))}, \tag{7}$$

Specifically, E represents an original view (i.e., original skeleton spatio-temporal graph), Ẽ represents an enhanced view, and $\tilde{L}_{rec}$ represents a Bayesian personalized ranking (BPR) loss, such that the difference between the enhanced view and the original view is maximized as much as possible, and $I(E_n; \tilde{E}_n)$ represents mutual information between two corresponding node views, and $I(E_e; \tilde{E}_e)$ represents mutual information between two corresponding edge views, s(·) represents similarity between two vectors, $E_n$ and $E_e$ are original views without node and edge deleted, $\tilde{E}_n$ and $\tilde{E}_e$ are the enhanced node-dropping and edge-dropping views, $v_i$ and $\tilde{v}_i$ are vector representations of corresponding nodes in the corresponding node views, $e_i$ and $\tilde{e}_j$ are vector representations corresponding edges in the corresponding edge views.

Step 5, a human interactive behavior recognition result based on the multi-view representation is obtained.

The advantages of the above scheme lie in that for identifying human interactive behavior based on multi-view comparison can learn whether to delete edges or nodes, convert the original skeleton diagram into related views, and then integrate different views into a compact representation of the downstream behavior recognition task, and simultaneously optimize with the downstream behavior recognition task in an end-to-end manner, further improving the robustness of the model.

Embodiment 2

Figure 5:
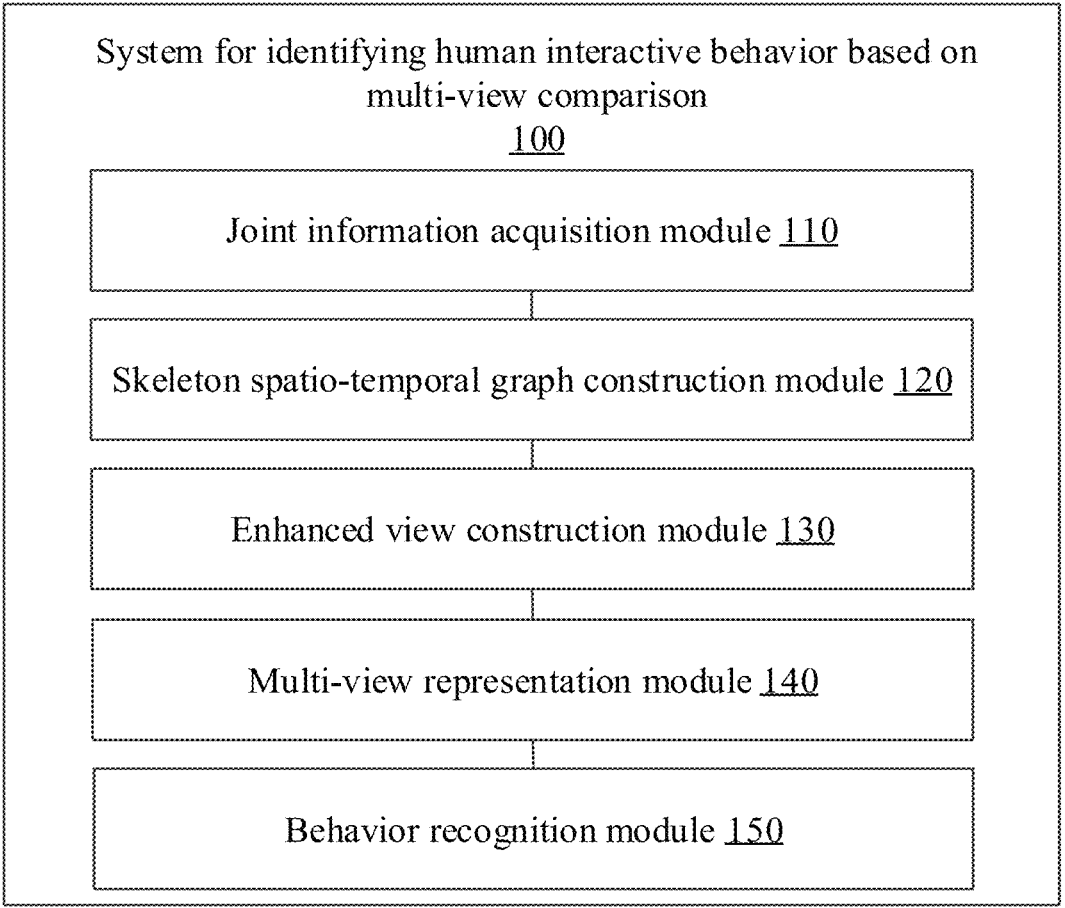
FIG. 5 illustrates a schematic block diagram of a system for identifying human interactive behavior based on multi-view comparison according to an embodiment of the disclosure.

As shown in FIG. 5, this embodiment provides a system 100 for identifying human interactive behavior based on multi-view comparison, which includes a joint information acquirer 110 (also referred to as joint information acquisition module), a skeleton spatio-temporal graph constructor 120 (also referred to as skeleton spatio-temporal graph construction module), an enhanced view constructor 130 (also referred to as enhanced view construction module), a multi-view presenter 140 (also referred to as multi-view representation module), and a behavior recognizer 150 (also referred to as behavior recognition module).

Specifically, the joint information acquisition module 110 is configured (i.e., arranged and structured) to acquire position information of human joints in each frame of video data.

The skeleton spatio-temporal graph construction module 120 is configured to construct a skeleton spatio-temporal graph based on the position information of human joints in each frame.

The enhanced view construction module 130 is configured to adaptively delete an edge or a node of the skeleton spatio-temporal graph based on the skeleton spatio-temporal graph through a graph convolution neural network, and construct an enhanced node-dropping view or an enhanced edge-dropping view.

The multi-view representation module 140 is configured to adopt an information bottleneck principle, increase a difference between the enhanced view and an original skeleton spatio-temporal graph, maximize information related to a behavior recognition task simultaneously, and reserve minimum enough information for the behavior recognition task in each view to obtain a multi-view representation.

The behavior recognition module 150 is configured to perform classification based on the obtained multi-view representation to obtain a human interactive behavior recognition result. In an embodiment, each of the joint information acquisition module, the skeleton spatio-temporal graph construction module, the enhanced view construction module, the multi-view representation module, and the behavior recognition module is embodied by software stored in at least one memory and executable by at least one processor.

Embodiment 3

Figure 6:
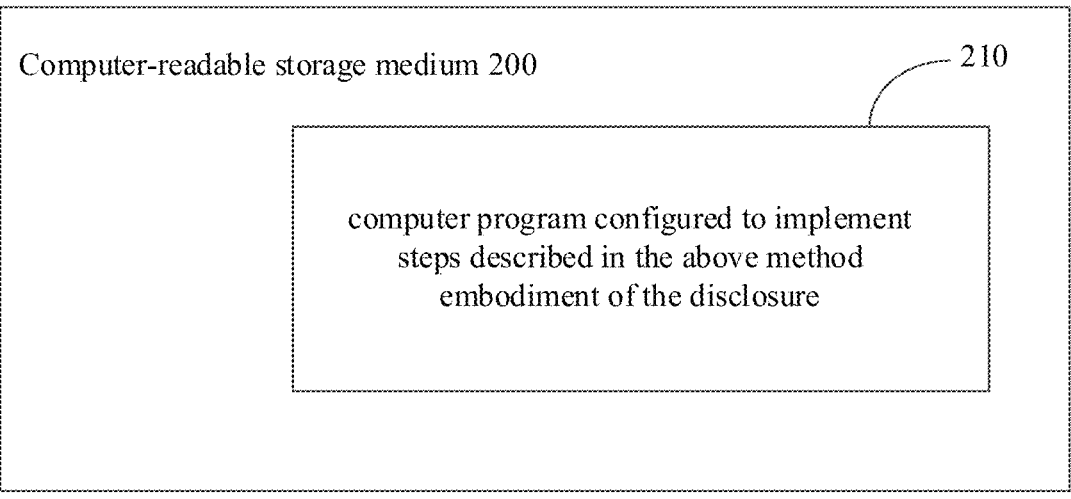
FIG. 6 illustrates a schematic block diagram of a non-transitory computer-readable storage medium according to an embodiment of the disclosure.

As shown in FIG. 6, this embodiment provides a non-transitory computer-readable storage medium 200, in which a computer program 210 is stored, and the computer program is configured to, when being executed by a processor, implement steps in the method for identifying human interactive behavior based on multi-view comparison as described in the embodiment 1.

Embodiment 4

Figure 7:
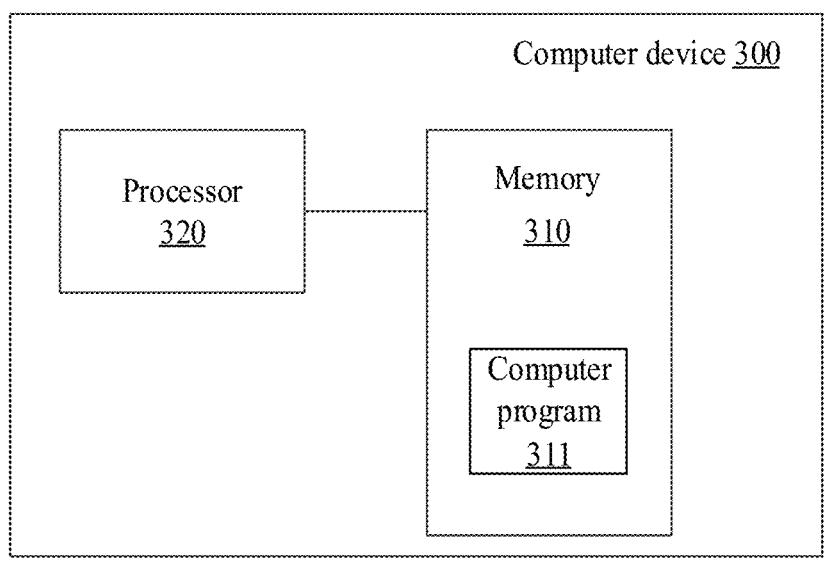
FIG. 7 illustrates a schematic block diagram of a computer device according to an embodiment of the disclosure.

As shown in FIG. 7, this embodiment provides a computer device 300, including a memory 310, a processor 320 and a computer program 311 stored in the memory and capable of being run on the processor, and the processor is configured to, when executing the computer program, implement steps in the method for identifying human interactive behavior based on multi-view comparison as described in the embodiment 1.

It should be understood by those skilled in the art that embodiments of the disclosure can be provided as methods, systems, or computer program products. Therefore, the disclosure can take the form of a hardware embodiment, a software embodiment, or an embodiment combining software and hardware aspects. Moreover, the disclosure can take the form of a computer program product implemented on one or more computer-usable storage media (including but not limited to magnetic disk storage and optical storage) containing computer-usable program codes therein.

The disclosure is described with reference to flowcharts and/or block diagrams of methods, devices (systems) and computer program products according to embodiments of the disclosure. It should be understood that each flow and/or block in the flowchart and/or block diagram, and combinations of the flow and/or block in the flowchart and/or block diagram can be implemented by computer program instructions. These computer program instructions may be provided to a processor of a general-purpose computer, special-purpose computer, embedded processor or other programmable data processing apparatus to produce a machine, such that the instructions which are executed by the processor of the computer or other programmable data processing apparatus produce means for implementing the functions specified in the flowchart flow or flows and/or block or blocks in the block diagram.

These computer program instructions may also be stored in a computer-readable memory that can direct a computer or other programmable data processing apparatus to function in a particular manner, such that the instructions stored in the computer-readable memory produce an article of manufacture including instruction means that implement the functions specified in one or more flow charts and/or block diagrams.

These computer program instructions may also be loaded onto a computer or other programmable data processing apparatus, such that a series of operational steps are performed on the computer or other programmable apparatus to produce a computer-implemented process, such that the instructions executed on the computer or other programmable apparatus provide steps for implementing the functions specified in a flow or flows of the flowchart and/or a block or blocks of the block diagram.

Those skilled in the art can understand that all or part of the processes in the method for realizing the above-mentioned embodiments can be completed by instructing related hardware through a computer program, which can be stored in a computer-readable storage medium, and when executed, the program can include the processes of the above-mentioned embodiments. The storage medium can be a magnetic disk, an optical disk, a Read-Only Memory (ROM) or a Random Access Memory (RAM).

The above are only the illustrated embodiments of the disclosure and are not intended to limit the disclosure. For those skilled in the art, the disclosure may have various modifications and changes. Any modification, equivalent substitution, improvement, etc. made within the spirit and principle of the disclosure should be included in the protection scope of the disclosure.

What is claimed is:

1. A method for identifying human interactive behavior based on multi-view comparison, comprising:

acquiring position information of human joints in each frame of video data;

constructing a skeleton spatio-temporal graph based on the position information of human joints in each frame;

based on the skeleton spatio-temporal graph, adaptively deleting an edge and a node of the skeleton spatio-temporal graph through a graph convolution neural network, and constructing an enhanced node-dropping view and an enhanced edge-dropping view;

adopting an information bottleneck principle, increasing a difference between an enhanced view and an original skeleton spatio-temporal graph, simultaneously maximizing information related to a behavior recognition task, and reserving minimum enough information for the behavior recognition task in each view to obtain a multi-view representation; wherein the enhanced view is selected from the group consisting of: (i) the enhanced node-dropping view and (ii) the enhanced edge-dropping view; and performing classification based on the multi-view representation to obtain a human interactive behavior recognition result;

wherein the adopting an information bottleneck principle, increasing a difference between one of the enhanced node-dropping view and the enhanced edge-dropping view and an original skeleton spatio-temporal graph, simultaneously maximizing information related to a behavior recognition task specifically comprises:

minimizing mutual information between one of the enhanced node-dropping view and the enhanced edge-dropping view and the original skeleton spatio-temporal graph by using negative contrastive learning loss to remove redundant information in each view and reserve remaining information;

wherein expressions for the minimizing mutual information between the enhanced view and the original skeleton spatio-temporal graph by using negative contrastive learning loss to remove redundant information in each view and reserve remaining information are:

$$\min_{(E,\tilde{E})} \tilde{L}_{rec} + I(E_n; \tilde{E}_n) + I(E_e; \tilde{E}_e),$$

$$I(E_n; \tilde{E}_n) = \sum_{v_i \in V} \log \frac{\exp(s(v_i, \tilde{v}_i))}{\sum_{v_j \in v} \exp(s(v_i, \tilde{v}_j))},$$

$$I(E_e; \tilde{E}_e) = e_i \in u \log \frac{\exp(s(e_i, \tilde{e}_i))}{\sum_{e_j \in u} \exp(s(e_i, \tilde{e}_j))},$$

where E represents the original skeleton spatio-temporal graph, Ẽ represents one of the enhanced node-dropping view and the enhanced edge-dropping view, and $\tilde{L}_{rec}$ represents a Bayesian personalized ranking (BPR) loss, such that the difference between the enhanced view and the original skeleton spatio-temporal graph is maximized, and $I(E_n; \tilde{E}_n)$ represents mutual information between two corresponding node views, and $I(E_e; \tilde{E}_e)$ represents mutual information between two corresponding edge views, s(•) represents similarity between two vectors, $E_n$ and $E_e$ are original views without node and edge deleted, $\tilde{E}_n$ and $\tilde{E}_e$ are the enhanced node-dropping and edge-dropping views, $v_i$ and $\tilde{v}_i$ are vector representations of corresponding nodes in the corresponding node views, $e_i$ and $\tilde{e}_j$ are vector representations corresponding edges in the corresponding edge views.

2. The method according to claim 1, wherein the constructing a skeleton spatio-temporal graph based on the position information of human joints in each frame specifically comprises:

in a spatial dimension, determining spatial positions of the human joints according to coordinate information of the human joints in each frame, and then drawing corresponding edges according to a natural structure of a human body to obtain a spatial topological graph of a skeleton sequence; and after constructing the spatial topological graph of the skeleton sequence, connecting nodes representing a same joint in adjacent frames to form a skeleton spatio-temporal sequence graph as the skeleton spatio-temporal graph.

3. The method according to claim 1, wherein the based on the skeleton spatio-temporal graph, adaptively deleting an edge and a node of the skeleton spatio-temporal graph through a graph convolution neural network, and constructing an enhanced node-dropping view and an enhanced edge-dropping view specifically comprises:

learning a deletable node of each layer of the graph convolution neural network, and creating a node-dropping view as the enhanced node-dropping view after shielding an influential node; and learning a deletable edge of each layer of the graph convolution neural network, and creating an edge-dropping view as the enhanced edge-dropping view after filtering out a noise edge.

4. The method according to claim 3, wherein an expression for the learning a deletable node at each layer of the graph convolution neural network, and creating a node-dropping view as the enhanced edge-dropping view after shielding an influential node is:

$$G_{ND}^{(l)} = \{\{v_i \odot \rho_i^{(l)} \mid v_i \in V\}, \varepsilon\},$$

where $v_i$ represents an i-th node in an I-th network layer, and $$\rho_i^{(l)} \in (0, 1)$$

comes from a Bernoulli distribution parameterized as $$\omega_i^{(l)},$$

indicating whether the node $v_i$ is reserved or not, and ε represents a set of edges.

5. The method according to claim 1, wherein the skeleton spatio-temporal graph input the graph convolution neural network is in a form of an adjacency matrix with a size of n*n, where n represents a number of nodes in the skeleton spatio-temporal graph; when there is a connection between two nodes, an element value of a corresponding position in the adjacency matrix is 1, and vice versa is 0.

6. A non-transitory computer-readable storage medium, stored with a computer program, wherein the computer program is configured to, when being executed by a processor, implement steps in the method for identifying human interactive behavior based on multi-view comparison according to claim 1.

7. A computer device, comprising a memory, a processor and a computer program stored in the memory and capable of being run on the processor, wherein the processor is configured to, when executing the computer program, implement the steps in the method for identifying human interactive behavior based on multi-view comparison according to claim 1.

\* \* \* \* \*